March 9, 1971  C. D. JOHNSON, JR  3,568,256
PLASTIC FEEDER HEAD

Filed July 15, 1968  3 Sheets-Sheet 1

INVENTOR
CLIFFORD DAVID JOHNSON JR.
BY
*William Frederick Werner*
ATTORNEY

March 9, 1971  C. D. JOHNSON, JR  3,568,256
PLASTIC FEEDER HEAD

Filed July 15, 1968  3 Sheets-Sheet 2

INVENTOR
CLIFFORD DAVID JOHNSON JR
BY
William Frederick Werner
ATTORNEY

March 9, 1971    C. D. JOHNSON, JR    3,568,256
PLASTIC FEEDER HEAD

Filed July 15, 1968    3 Sheets-Sheet 3

INVENTOR
CLIFFORD DAVID JOHNSON JR.
BY
William Frederick Werner
ATTORNEY

United States Patent Office 3,568,256
Patented Mar. 9, 1971

3,568,256
PLASTIC FEEDER HEAD
Clifford David Johnson, Jr., North Stonington, Conn., assignor to J.&J. Machine Co., Inc., Providence, R.I.
Filed July 15, 1968, Ser. No. 744,735
Int. Cl. B29f *1/00*
U.S. Cl. 18—30                                         12 Claims

ABSTRACT OF THE DISCLOSURE

This specification discloses a feeder head of the type now commonly employed in the molding of plastics for the purpose of delivering plastic to a mold. The head comprises two coaxial cylindrical parts. One of these has a passage communicating with the supply of plastic. The other carries a plurality of nozzles each of which is connected by a branch passage to a manifold in communication with the supply passage in the head part aforesaid. The head parts are angularly adjustable and held in an adjusted position by a pair of screw bolts anchored in the first head part and passing through diametrically opposed arcuate slots in the other part.

---

The present invention has to do with the heads now commonly employed in plastic molding for feeding plastic to molds and is concerned primarily with a novel head that is readily adapted to accommodating a plurality of nozzles.

In accordance with present day practice a plurality of molds are indexed, or moved with a step by step motion past a feeding head. If each mold has only a single injection port and the head carries one nozzle no problem in properly co-relating these elements as the molds are indexed is presented. However, in many instances the mold has two or more injection ports and the head a corresponding number of nozzles. Obviously these nozzles must be properly positioned in the head to accurately mate with the ports of a mold as it passes therebeneath.

With these conditions in mind, the present invention has in view, as an important object, the provision of a plastic feeder head of the type noted which comprises two parts that are angularly adjustable and one of which carries a plurality of nozzles, together with means for holding the head parts in an adjusted position.

More in detail, the invention has as an object, the provision of a plastic feeder head of the character indicated in which the two parts are cylindrical and coaxially assembled. The part carrying the nozzles is formed with a branch passage for each nozzle with the several passages meeting at a common central manifold. The other part has an axial passage communicating with the manifold at one end and a supply of plastic at the other.

Another object is to provide, in an adjustable head of the character aforesaid, means for maintaining the head parts in an adjusted position which takes the form of at least one, and preferably two, arcuate slots in the nozzle carrying head part together with a screw bolt passing through each slot and anchored in the other head part. When two slots and bolts are utilized they are arranged in diametrically opposed relation.

It is desirable that the head part carrying the nozzles have a lower exposed face that is free and clear of any projections other than the nozzles. Thus another object is to provide, in an adjustable head of the kind described headed screw bolts with the heads being countersunk in the slots and formed with wrench engaging sockets.

To the end of limiting inward movement of screw bolts the arcuate slots are formed with shoulers defining the enlarged portions thereof which receive the bolt heads. These shoulders are engaged by the bolt heads to limit such inward movement.

Various other more detailed objects and advantages of the invention such as arise in connection with carrying out the above noted ideas in a practical embodiment will in part become apparent and in part be hereinafter stated as the description of the invention proceeds.

For a full and more complete understanding of the invention reference may be had to the following description and accompanying drawings wherein.

Referring now to the drawings, wherein like reference characters denote corresponding parts, and first more particularly to FIGS. 1 to 5 inclusive, what might be called the simplest form of the invention will be described.

Figures 1, 2:
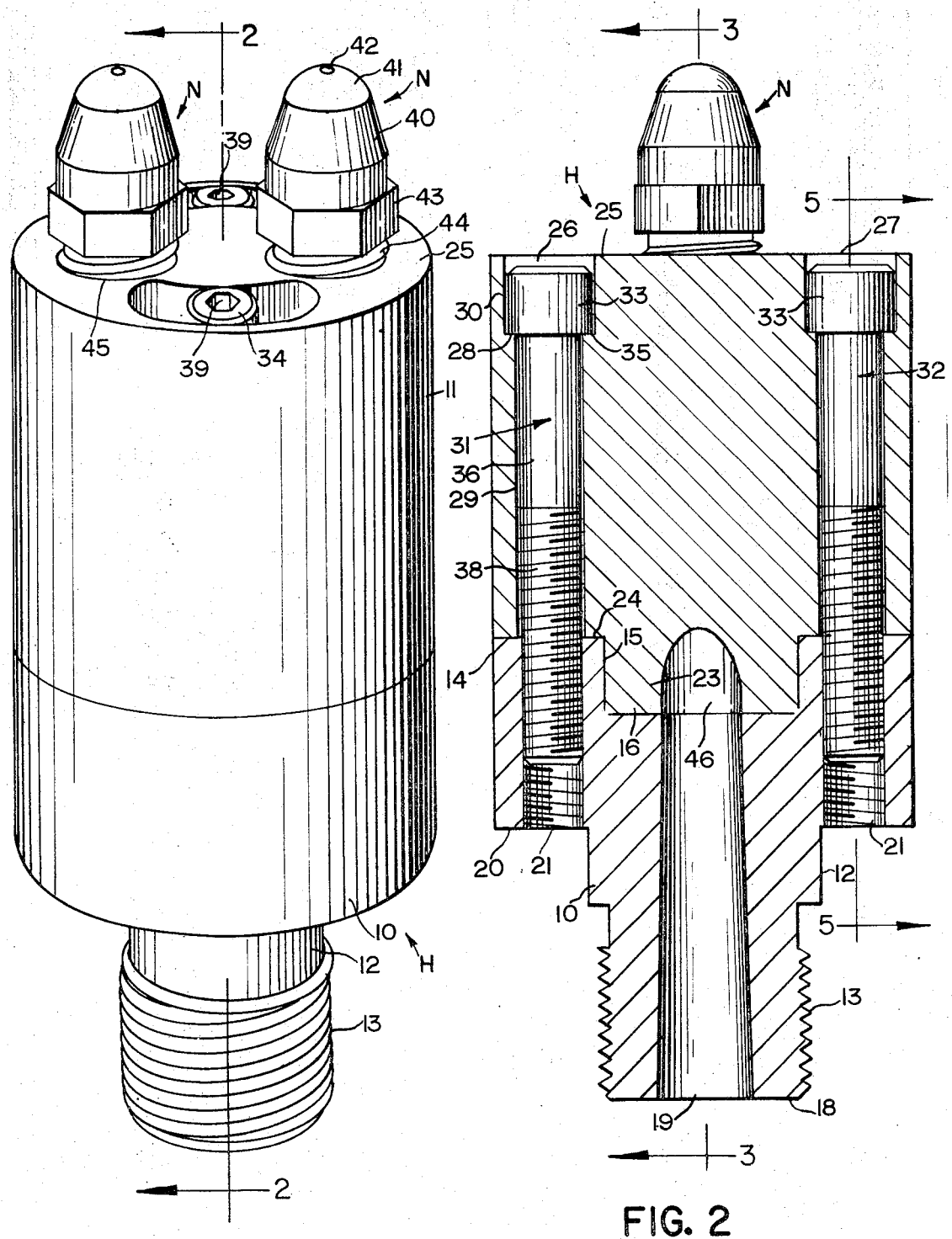
FIG. 1 is a perspective of an adjustable plastic feeder head designed in accordance with the precepts of this invention.
FIG. 2 is an axial section through the head of FIG. 1, being taken about on the plane represented by the line 2—2 of FIG. 1.
Figure 3:
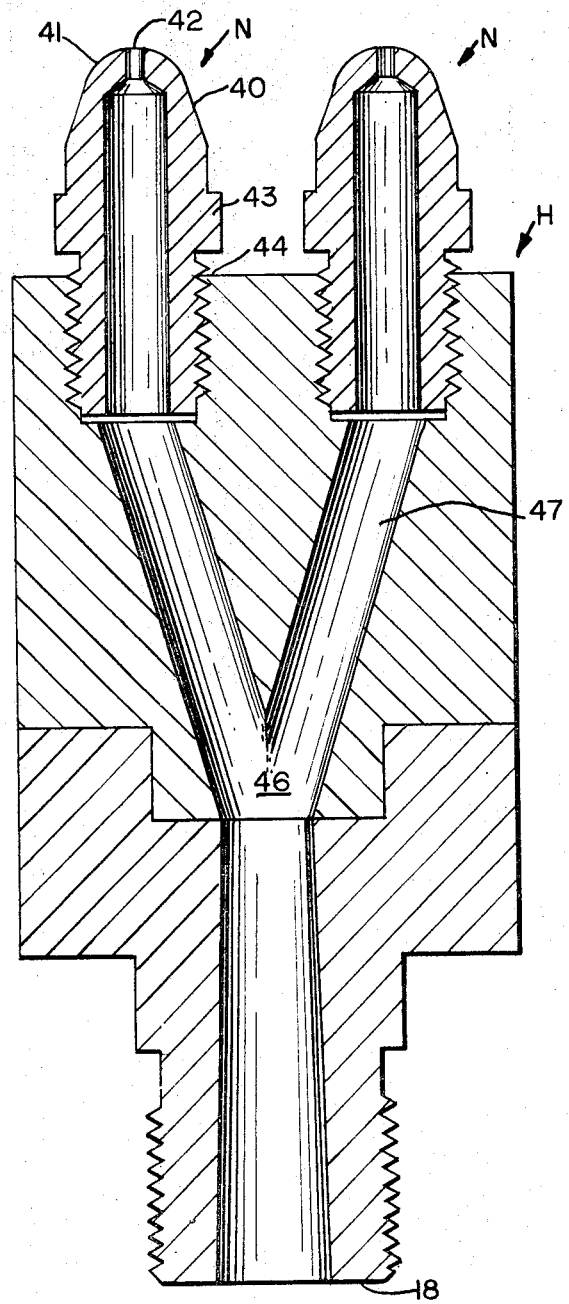
FIG. 3 is another axial section normal to FIG. 2, being taken about on the plane represented by the line 3—3 of FIG. 2.
Figure 4:
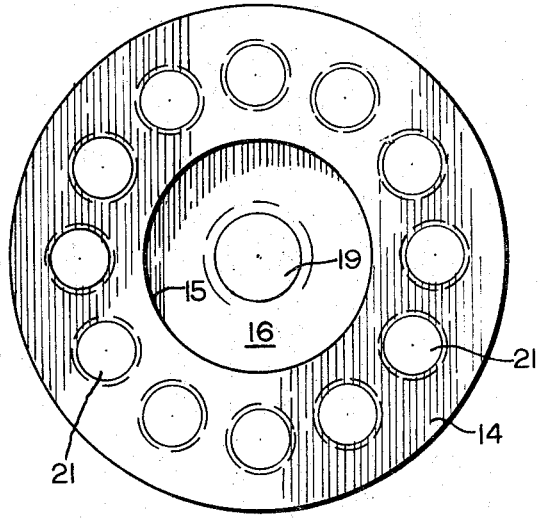
FIG. 4 is a plan view of the plastic receiving head part per se.
Figure 5:
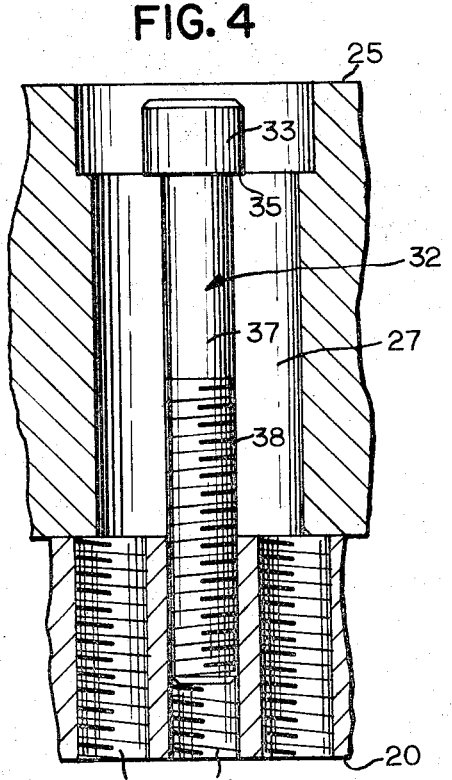
FIG. 5 is a longitudinal section through an arcuate slot, being taken about on the plane represented by the line 5—5 of FIG. 2.

A feeder head is identified in its entirety by the reference character H. It comprises two parts, namely, a plastic receiving part 10 and a nozzle carrying part 11. Both of these parts are cylindrical and preferably of the same diametric dimension.

The part 10 is formed with a neck 12 which is threaded at its free end as indicated at 13. The end of part 10 remote from the neck 12 takes the form of a flat annular surface 14 which defines a central well or socket presenting a cylindrical surface 15 and an annular end surface 16. The neck 12 terminates at an end face 18 and a passage 19 extends between the surfaces 16 and 18. This passage 19 has a slight draw or taper as illustrated to exert a concentrating or constricting force on plastic introduced into the passage 19 at end 18.

The threaded neck 12 constitutes means for connecting the head H to an appropriate supply of plastic which is to be delivered to molds.

A shoulder 20 constitutes a line of demarcation between the neck 12 and the main body portion of the head part 10. Each of a plurality of threaded bolt holes is designated 21 and extends between the surface 14 and shoulder 20. They are so arranged that each hole 21 has another hole 21 in diametric opposed relation.

The head part 11 is formed with a central boss 23 defined by a cylindrical wall in engagement with the wall 15 and an end face engaging the socket face 16. The presence of this boss 23 results in an annular shoulder 24 in abutting engagement with the annular surface 14.

The end face of part 11 remote from the boss 23 is designated 25. Opening into this face 25 are two arcuate slots 26 and 27. These slots 26 and 27 are diametrically opposed and are substantial duplicates, hence the details of only one slot is herein described as that is believed to be sufficient for the purpose of this specification.

Spaced inwardly from the surface 25 a distance somewhat greater than the thickness of a bolt head to be later described, and in each slot 26 and 27 is a shoulder 28. This shoulder defines a comparatively narrow slot part 29 which extends to the shoulder 24 and an outer wider slot part 30 which opens onto the face 25. The bold holes 21 open onto the narrower portions 29 of the slots 26 and 27.

A pair of bolts are identified in their entireties at 31 and 32. These bolts are also identical and each includes a head 33 having a flat end face 34 and an inner abutment shoulder 35. From the latter extends a stem 36 the end portion of which is threaded as indicated at 38.

Opening onto the bolt head face 34 is a wrench engaging socket 39 which is adapted to receive an Allen wrench in a well known manner. When the bolts 31 and 32 are tightened to the extent where the shoulders 28 and 35 are in abutting engagement the end faces 34 of the bolt heads are within the wider slot portions 30, leaving the head face 25 free of any projections except for the nozzles now to be described.

Each of a pair of nozzles is referred to in its entirety by the reference character N. Each nozzle N has a conical portion 40 terminating in a rounded end face 41 having a central discharge orifice 42. Each nozzle N also has a wrench engaging portion such as the hex 43. From the latter extends a threaded shank 44.

Formed in the head part 11 and opening onto the face 25 thereof are two threaded recesses 45 into which are screwed the shanks 44. These recesses 45 are preferably diametrically opposed as illustrated and are located substantially midway between the slots 26 and 27.

A central manifold takes the form of a recess 46 which opens onto the end face of the boss 23. Passages 47 communicate between this manifold 46 and the recesses 45. From the latter the hollow construction of the nozzles N establishes communication with the orifices 42.

While the mode of usage of the plastic feeder head depicted in FIGS. 1 to 5 and described above is believed to be obvious it may be briefly outlined by noting that the head is ordinarily used in a position inverted with respect to the showing of the drawing. That is, the nozzles N are in the lowermost position.

When it is desired to adjust the head H so that the orifices 42 will be properly co-related to the injection ports of a mold to be positioned therebeneath an Allen wrench is applied to the sockets 39 to loosen the bolts 31 and 32. The head part 11 is now rotated relative to the part 10 to achieve the desired adjustment. The bolts are then tightened to secure the adjusted position. Needless to say the bolts 31 and 32 maintain the assembled relation of the head parts 10 and 11.

It will be understood that the series of bolt holes 21 offers a wide selection as to which pair will be used at any one time. This provides an almost infinite range of permissible adjustment.

Figure 6:
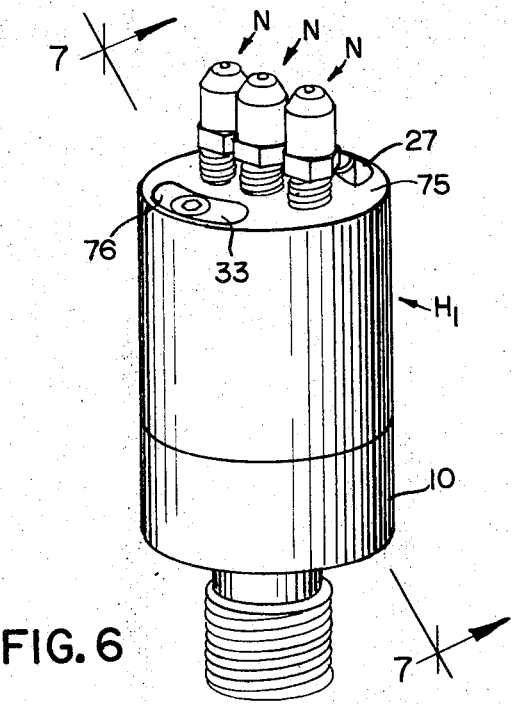
FIG. 6 is a perspective of one modification in which three nozzles are included.
Figure 7:
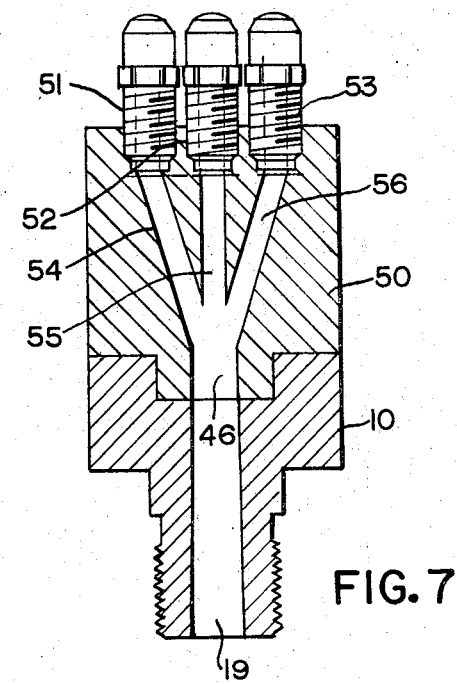
FIG. 7 is an axial section through the head of FIG. 6, being taken about on the plane represented by the line 7—7 of FIG. 6.

Referring now more particularly to FIGS. 6 and 7, a modified form of invention which accommodates three nozzles N will be described. Thus the head of FIGS. 6 and 7 is identified at $H_1$. It comprises a plastic receiving part that is identical with that illustrated in FIGS. 1 to 5 and the details thereof are designated by the same reference characters as in FIGS. 1 to 5. The nozzle carrying part is indicated at 50.

This part 50 has the same arcuate slots 26 and 27 which receive bolts 31 and 32 having heads 33 the same as in FIGS. 1 to 5. It also has the same manifold or recess 46 which communicates with the passage 19. However there are three threaded sockets or recesses 51, 52, and 53 which open onto the face 25. A passage 54 extends from the bottom of socket 51 to the recess 46, another passage 55 from socket 52 to manifold 46, and a third passage 56 from socket 53 to recess 46.

Figure 8:
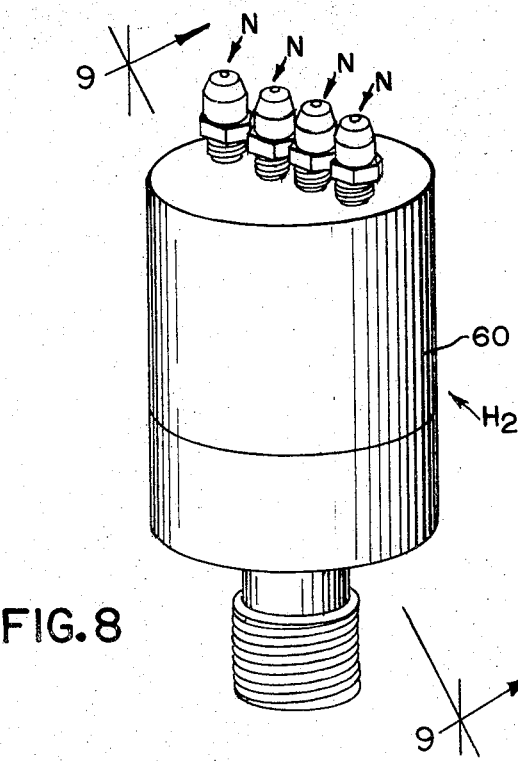
FIG. 8 is a perspective of another embodiment in which four nozzles are included.
Figure 9:
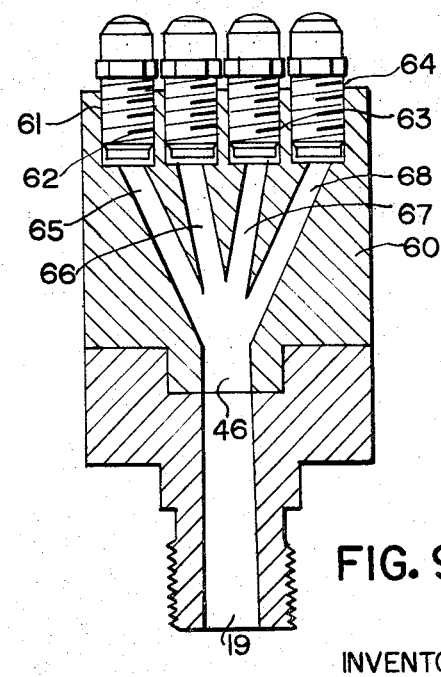
FIG. 9 is an axial section through the head of FIG. 8, being taken about on the plane represented by the line 9—9 of FIG. 8.

FIGS. 8 and 9 depict still another modification in which four nozzles N are mounted in the head $H_2$. Here again the construction is the the same as in the other two forms except that the head part 60 is formed with four threaded sockets 61, 62, 63, and 64 each of which receives a nozzle N. Passages 65, 66, 67, and 68 connect the respective sockets 61, 62, 63, and 64 to the manifold 46.

While preferred specific embodiments of the invention are hereinbefore set forth it is to be clearly understood that the invention is not to be limited to the exact constructions, mechanisms and devices illustrated and described because various modifications of these details may be provided in putting the invention into practice within the purview of the appended claims.

What is claimed is:

1. In an adjustable plastic feeder head, a plastic receiver part having a plastic receiving passage, a nozzle carrying part coaxially mounted on and rotatable with respect to said plastic receiving part, a plurality of nozzles carried by said nozzle carrying part and in communication with said passage, said parts being angularly adjustable in the plane formed at their meeting faces relative to one another, and clamping means for mechanically forcing said receiver part against said nozzle carrying part under sufficient pressure to generate that friction necessary to maintain said parts in an adjusted position.

2. The plastic feeder head of claim 1 in which said adjustment maintaining means comprises an arcuate slot in the nozzle carrying part and a headed screw bolt in said slot and anchored in said plastic receiving part.

3. The feeder head of claim 1 in which said adjustment maintaining means comprises a pair of diametrically opposed arcuate slots in said nozzle carrying part together with a headed bolt in each slot anchored to said plastic receiving part.

4. The feeder head of claim 2 in which said arcuate slot has an inner abutment shoulder and said bolt has a head engaging said shoulder to limit inward movement thereof.

5. The feeder head of claim 3 in which the nozzle carrying part has a manifold communicating with said passage and a branch passage between each of said nozzles and said manifold.

6. The feeder head of claim 1 in which the plastic receiving part is formed with acentral recess and the nozzle carrying part has a boss coaxially received in said recess.

7. The feeder head of claim 1 in which there are a pair of nozzles and passages communicating between said nozzles and the pasage in said plastic receiving part.

8. The feeder head of claim 1 in which said nozzle carrying part is formed with a manifold and three sockets, a passage communicating between each socket and said manifold, and a nozzle in each of said sockets.

9. The feeder head of claim 2 in which the arcuate slot has a shoulder defining an inner narrow portion and an outer wider portion and the bolt has a head engaging said shoulder to limit inward movement of the bolt.

10. The feeder head of claim 1 in which the nozzle carrying part is formed with a manifold and four sockets together with a passage communicating between each socket and the manifold, and a nozzle in each of said sockets.

11. The feeder head of claim 2 in which the plastic receiving part has an end face into which opens a plurality of angularly spaced threaded bolt holes, one of which receives said bolt.

12. The feeder head of claim 3 in which the plastic receiving part has an end face and a plurality of threaded bolt holes opening onto said end face, said bolt holes being angularly spaced and arranged to provide a plurality of diametrically opposed pairs of holes, one of said pairs receiving said bolts.

References Cited

UNITED STATES PATENTS 2,206,098   7/1940   Lester _____ 18—30(NR)

FOREIGN PATENTS 1,015,492   10/1952   France _____ 18—30(NM)
1,194,138   11/1959   France _____ 18—30(NP)

H. A. KILBY, Jr., Primary Examiner

U.S. Cl. X.R.

18—12